United States Patent
Ryu et al.

(10) Patent No.: US 7,469,274 B1
(45) Date of Patent: Dec. 23, 2008

(54) SYSTEM AND METHOD FOR IDENTIFYING THIRD PARTY COPY DEVICES

(75) Inventors: Sung-Wook Ryu, Mountain View, CA (US); James Olson, Fridley, MN (US); William Kawakami, Belmont, CA (US); Andrew Roe, St. Paul, MN (US)

(73) Assignee: Symantec Operating Corporation, Cupertino, CA (US)

( * ) Notice: Subject to any disclaimer, the term of this patent is extended or adjusted under 35 U.S.C. 154(b) by 0 days.

(21) Appl. No.: 10/742,221

(22) Filed: Dec. 19, 2003

(51) Int. Cl.
*G06F 13/00* (2006.01)

(52) U.S. Cl. .................................................. 709/214

(58) Field of Classification Search ................ 709/200, 709/201, 212, 213, 214, 223, 225; 711/100, 711/133, 161, 162; 714/1, 2, 3, 5, 6, 13, 714/15, 20, 40, 41
See application file for complete search history.

(56) References Cited

U.S. PATENT DOCUMENTS

| | | | |
|---|---|---|---|
| 6,711,585 B1 | 3/2004 | Copperman et al. ...... | 707/104.1 |
| 6,883,083 B1* | 4/2005 | Kemkar ...................... | 711/203 |
| 2003/0005119 A1 | 1/2003 | Mercier et al. ............. | 709/225 |
| 2003/0033485 A1 | 2/2003 | Ohr ............................. | 711/133 |
| 2003/0149830 A1 | 8/2003 | Torr et al. .................. | 711/100 |
| 2003/0167312 A1 | 9/2003 | Mori .......................... | 709/212 |
| 2003/0177168 A1 | 9/2003 | Heitman et al. ............. | 709/201 |
| 2003/0182422 A1 | 9/2003 | Bradshaw et al. ........... | 709/225 |
| 2004/0024854 A1 | 2/2004 | Mandal ...................... | 709/223 |
| 2004/0030768 A1 | 2/2004 | Krishnamoorthy et al. .. | 709/223 |
| 2004/0177130 A1* | 9/2004 | Chambliss et al. .......... | 709/219 |

FOREIGN PATENT DOCUMENTS

| | | |
|---|---|---|
| WO | WO 02/071220 A | 9/2002 |
| WO | WO 02/071224 A1 | 9/2002 |
| WO | WO 02/075571 A1 | 9/2002 |
| WO | WO 03/009092 A2 | 1/2003 |
| WO | WO 03/027886 A1 | 4/2003 |
| WO | WO 2004/019229 | 3/2004 |

\* cited by examiner

*Primary Examiner*—Robert B Harrell
(74) *Attorney, Agent, or Firm*—Campbell Stephenson LLP

(57) ABSTRACT

Systems, methods, apparatus and software can be implemented to discover third-party copy devices in a distributed computing environment, determine which of the third-party copy devices is best suited for a particular data moving application, and thereby better utilize network and computing system resources. Moreover, environment changes (e.g., device failure, network traffic changes, new device addition) can be dynamically incorporated into the information used for third-party copy device discovery and selection. These systems, methods, apparatus and software help to reduce human errors which can cause failures in critical data protection operations.

41 Claims, 5 Drawing Sheets

SYSTEM AND METHOD FOR IDENTIFYING THIRD PARTY COPY DEVICES

FIELD OF THE INVENTION

The present invention relates to third party copy devices and, more particularly, to discovering and selecting third party copy devices in storage networks.

BACKGROUND OF THE INVENTION

The ever increasing reliance on information and the computing systems that produce, process, distribute, and maintain such information in its myriad forms continues to put great demands on techniques for data protection. Simple systems providing periodic backups of a computer system's data have given way to more complex and sophisticated data protection schemes that take into consideration a variety of factors including: the wide variety of computing devices and platforms encountered, numerous different types of data that must be protected, the speed with which data protection operations must be executed, and the flexibility demanded by today's users.

FIG. 1 illustrates an example of a data protection system for use in a variety of computing environments, e.g., small business, enterprise, educational, and government computing environments. Such data protection systems typically provide functionality for one or more of: data backup, data recovery, data duplication, and data archiving. Moreover, the data manipulated by such systems can include all manner of computer readable information including computer software, image files, text files, database data, and the like. Computing system 100 includes a number of computer systems such as servers 105, 110, 115, and 120, and workstations 125 and 130 interconnected by network 135 and/or directly connected with each other. Network 135 can implement any of a wide variety of well known computer networking schemes but is typically a local area network (LAN), an enterprise-wide intranet, or a wide area network (WAN) such as the Internet. Each of the computer systems typically includes information such as system software, application software, application data, etc., that has some value to users of the computer systems and thus requires some level of data protection.

Information protection within computing system 100 is controlled and coordinated by software operating on master server 105. The software operating on master server 105 is the "brains" for all data protection activities and provides, for example, scheduling and tracking of client computer system backups and restorations, management of data storage media, and convenient centralized management of all backup and restoration activities. Master server 105 can also have one or more storage devices, e.g., tape drives and optical storage devices, attached directly to the server or through network 135 for backing up and restoring data from multiple clients. In support of such a data protection system, each of the data protection system clients (e.g., servers 120 and 115 and workstations 125 and 130) of master server 105 typically include backup and restore client software or agents. Such agents typically receive instructions from master server 105 and handle the extraction and placement of data for the particular client computer system. Together, master server 105 and the data protection agent operating on a client computer system can backup and restore files, directories, raw partitions, and databases on client systems. Such data protection software can also be used to archive and restore logical database data.

FIG. 1 also illustrates other possible components of computing system 100. In general, media server 110 operates under control of master server 105. Data protection administrative functions are performed centrally from master server 105, and master server 105 also controls backup scheduling for media server 110. Media server 110 performs actual data movement operations (e.g., backup operations and restore operations) under direction from the master server, and the data remains local to the media server and its respective storage devices. Variations on this basic scheme are well known in the art. For example, a master server and its associated media servers can be referred to collectively as a storage domain, and large networks may have more than one storage domain. A media server can share a storage device such as a robotic tape library with other devices such as its master server or another media server. Master servers, media servers, and storage devices can be directly connected to one another, connected to each other using a conventional network, or connected to each other using a specialized network such as a storage area network (SAN). Still other devices, such as SAN switches, SAN routers, storage appliances, and/or data movers (e.g., third-party copying devices) can be used in computing system 100. Finally, it should be noted that a master server can also operate as a media server and that master and media servers can treat themselves as data protection clients, e.g., they can backup and restore data from or to themselves.

In the example of FIG. 1, computing system 100 includes SAN 140. SAN 140 can be implemented using a variety of different technologies including SCSI, fibre channel arbitrated loop (FCAL), fibre channel switched fabric, IP networks (e.g., iSCSI), Infiniband, etc. SAN 140 can also include one or more SAN specific devices such as SAN switches, SAN routers, SAN hubs, or some type of storage appliance. Devices such as tape library 150, data mover 155, a group of disk drives 170 (i.e., "just a bunch of disks" or "JBOD"), and intelligent storage array 175 are attached to the SAN. Moreover, SAN specific devices such as SAN bridge 145 can also be part of the storage network. In this example, SAN bridge 145 might be a SCSI to fibre channel bridge providing access to additional devices such as tape drive 160 and optical storage 165.

Protecting the integrity of data as it is moved from one part of a computing system to another is an important aspect of any computer system. Data movement can result from a variety of operations including normal application software operation, data backup operations, data restore operations, and data relocation resulting from system design changes or hardware failures. In many computing systems, data movement is handled by programs executing on servers such as servers 115 and 120. In the case of data movement operations such as data backup and data restore, the use of server resources to handle the data movement means that fewer server resources are available for more typical operations such as application software and operating system overhead. Accordingly, efforts have been taken to move some I/O processing off of system servers to an off host agent. Such agents are often referred to as third-party copy (3PC or TPC) devices or data movers.

Third-party copy operations transfer data directly between storage devices in a SAN or other environment using a third-party copy device, copy manager, or data mover. Computing system 100 includes at least one such device (data mover 155), and can include third-party copy functionality in other forms such as SAN bridge 145 or media server 110. Thus, third-party copy devices can be a separate device as shown; part of a SAN switch, router, bridge, or another SAN network component, part of a server attached to the SAN, or within a storage element such as storage array 175. Third-party copy devices operate on behalf of some other piece of software, e.g., a backup or restore application, to accomplish the third part copy operation.

As sophisticated distributed data protection software is used more frequently in SAN environments, new challenges are faced. In many cases, SAN complexity is compounded by the existence of various zoning and device access restrictions. Moreover, the more storage devices and data movement devices present in the SAN, the more difficult it is to select the most efficient set of devices for a particular operation. Accordingly, it is desirable to have efficient and convenient mechanisms whereby third-party copy devices and their features can be discovered in an automated fashion. Moreover, it is desirable that these efficient and convenient mechanisms provide users with useful information about which third-party copy device among several should be used for a given data movement task.

SUMMARY OF THE INVENTION

It has been discovered that systems, methods, apparatus and software can be implemented to discover third-party copy devices in a distributed computing environment, determine which of the third-party copy devices is best suited for a particular data moving application, and thereby better utilize network and computing system resources. Moreover, environment changes (e.g., device failure, network traffic changes, new device addition) can be dynamically incorporated into the information used for third-party copy device discovery and selection. These systems, methods, apparatus and software help to reduce human errors which can cause failures in critical data protection operations.

Accordingly, one aspect of the present invention provides a method. An indication of a source storage device from which data will be transferred as part of a data protection operation is received. A third-party copy device coupled to the source storage device is identified. The third-part copy device is operable to copy data from the source storage device. A performance characteristic is determined of at least one of the third-party copy device and a connection between the third-party copy device and the source storage device.

In another aspect of the present invention, a system includes a memory, a processor coupled to the memory, and a third-party copy device selection module. At least a portion of the third-party copy device selection module is encoded as instructions stored in the memory and executable on the processor. The third-party copy device selection module is configured to: receive a source storage device identifier corresponding to a source storage device from which data can be transferred as part of a data protection operation; identify a third-party copy device coupled to the source storage device and operable to copy data from the source storage device to a destination storage device; and determine a performance characteristic of at least one of the third-party copy device, a connection between the third-party copy device and the source storage device, and a connection between the third-party copy device and the destination storage device.

In another aspect of the present invention, a computer readable medium includes program instructions executable on a processor. The computer readable medium is at least one of an electronic storage medium, a magnetic storage medium, an optical storage medium, and a communications medium conveying signals encoding the instructions. The program instructions are operable to implement each of: receiving an indication of a source storage device from which data will be transferred as part of a data protection operation; identifying a third-party copy device coupled to the source storage device and operable to copy data from the source storage device; and determining a performance characteristic of at least one of the third-party copy device and a connection between the third-party copy device and the source storage device.

Yet another aspect of the present invention provides an apparatus including: a means for receiving an indication of a means for storing source data from which data will be transferred as part of a data protection operation; a means for identifying a means for performing third-party copy operations; a means for determining a performance characteristic of at least one of the means for performing third-party copy operations and a connection between the means for performing third-party copy operations and the means for storing source data.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention and advantages thereof may be acquired by referring to the following description and the accompanying drawings, in which like reference numbers indicate like features.

DETAILED DESCRIPTION

The following sets forth a detailed description of at least the best contemplated mode for carrying out the one or more devices and/or processes described herein. The description is intended to be illustrative and should not be taken to be limiting.

Figure 1:
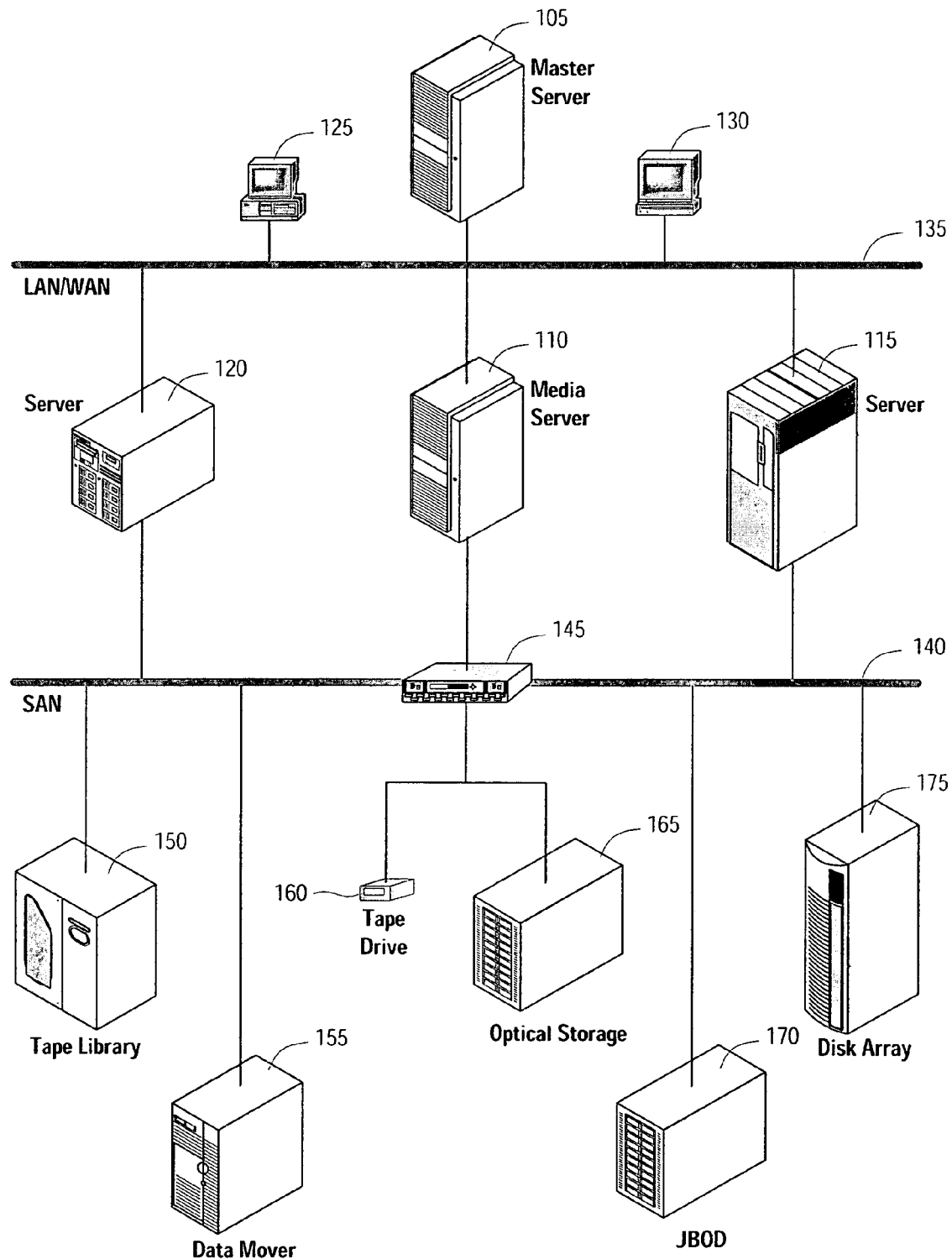
FIG. 1 is a simplified block diagram of a data protection system for use in a variety of computing environments.
Figure 2:
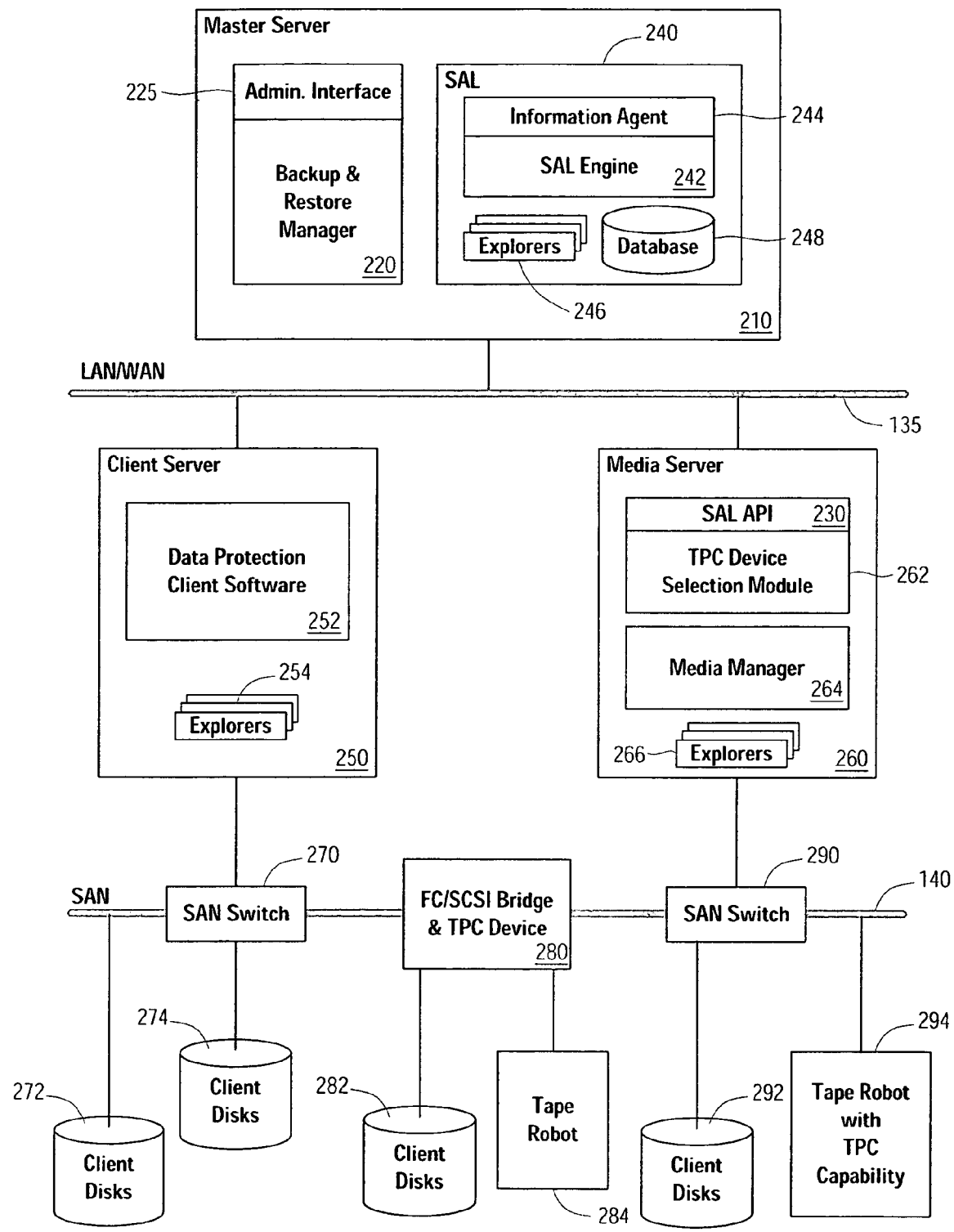
FIG. 2 is a simplified block diagram of portions of a computing system including some of the systems and methods of the present invention.

FIG. 2 is a simplified block diagram of a portion of a data protection system for use in a variety of computing environments. The data protection system components shown include master server 210, a client server 250, media server 260, and various storage and SAN devices described in detail below.

Master server 210 includes several software components: backup & restore manager 220, administration interface 225, and SAN access layer 240. As illustrated in FIG. 2, each of these pieces of software are shown as separate software modules. These modules, and indeed any of the software modules described herein, can be combined in various ways to form single software modules, implemented on separate computer systems, executed as separate threads on a single computer system, etc. For example, administration interface 225 (e.g., a command line interface or a graphical user interface) and backup & restore manager 220 can be part of the same program. Moreover other functionality, such as media server functionality (e.g., media manager 264), can be included in the software executing on master server 210. Examples of some of the data protection software shown operating on master server 210, media server 260, and client server 250 can be found in the VERITAS NetBackup™ family of products provided by VERITAS Software Corporation.

Administration interface 225 provides an entry point into the administration categories of the data protection system. System administration can be separated into a number of different areas, including for example media and device management and protection activity management. Using protection activity management functionality, an administrator can run reports on the system, create backup policies and storage units, manage a catalog of stored data, and configure host properties for master servers, media servers or clients. In addition to using administration interface 225, such tasks are typically performed using backup & restore manager 220. Using media and device management functionality, one can manage and monitor storage devices and various storage media. Such tasks are typically performed by media server 260 using media manager 264, again in conjunction with administration interface 225. Using these tools, the master server in a storage domain serves as a single point of administration for all backup operations in the storage domain. Administrators configure backup policies, manage media and media pools, and configure local and remote devices in the storage domain from the master server without the need to log on to or directly access any media servers. In addition to retaining backup schedules and other configuration information, the master server contains the backup catalog for the entire storage domain. Users can browse this catalog to locate and restore files.

Client server 250, operates data protection client software 252 in conjunction with the various data protection software present in master server 210 and media server 260. In some implementations, data protection client software 252 is responsible for gathering data that is the subject of some data protection activity from storage accessible to the client server (e.g., storage devices such as client disks 272, 274, 282, and 292) and forwarding it to media server 260. Media server 260 coordinates delivery of the data to a storage device such as tape robot 284. Other data protection operations, e.g., data restore, data duplication, and data archiving, can be implemented in a similar fashion.

Data protection software can also make use of the illustrated third-party copy devices to move data from a source device (e.g., a client disk) to a destination device (e.g., a tape robot) and thereby offload some or most of the operation overhead from data protection system clients like client server 250. Third-part copy devices can take a variety of different forms including: (1) proprietary data movers designed for use with specific types of client data and/or specific types of storage devices (e.g., the Fastrax data mover from EMC Corporation designed for use with the Symmetrix storage devices from EMC); (2) media servers acting as copy agents; and (3) SAN hardware devices (e.g., bridges, switches, tape robots, etc., and appropriate software executing on the SAN devices) that support third-party copy operations such as the SCSI-3 extended copy command. While the systems and methods disclosed herein can be generally implemented with any type of third-party copy device, the examples illustrated below will emphasize SCSI-3 extended copy based devices.

Because the data protection software is being used in a computing system that includes a SAN and a variety of SAN devices, the aforementioned third-party copy device discovery and selection problems are addressed in computing system 200. In order to automate, or at least automate much of, the task of discovering available SAN devices, their attributes, physical connections, logical connections, status, and the like, master server 210 includes SAN access layer 240. SAN access layer 240 typically includes one or more components such as SAL engine 242, information agent 244, explorers 246, and database 248. SAL engine 242 provides core SAN device discovery services. Such device discovery can include discovery of various third-party copy devices. SAL engine 242 typically performs a variety of functions such as: coordinating the activity of the explorers 246, managing changes to the database 248, and performing zoning operations by communicating with bridges and switches on the SAN 140. Although shown implemented on master server 210, SAN access layer 240 can generally operate on any computer system with adequate resources and access to SAN devices and explorers. For example, in some embodiments, SAN access layer 240 is implemented on a separate SAN management server.

Explorers 246 are discovery modules running within the SAL process (and in some cases on other devices such as client server 250 and media server 260). Each explorer typically uses a different method to discover information about objects on the SAN. Moreover, explorers may be designed for specific types of devices (host bus adapters, disk arrays, bridges, tape devices), protocols (SNMP), networks, applications, etc. Explorers 246 can include one or more explorers specifically designed to discover information about third-party copy devices. Alternately, explorers designed for some other SAN entity, e.g., a tape device explorer, can include features designed to discover third-party copy functionality associated with that entity. Thus, in some embodiments, explorers 246 provide an interface to different types of heterogeneous SAN components so that SAL 240 can provide a common data representation for heterogeneous SAN components. Explorers may communicate with the SAN components in an in-band fashion over the SAN fabric (e.g., fibre channel or SCSI) and/or in an out-of-band fashion over other networks (e.g., Ethernet) in order to inventory the SAN. Moreover, explorers operating outside SAL 240, such as explorers 254 and 266, can communicate with SAL 240 to provide similar information. Such explorers are often used from devices that may have device access and/or SAN visibility that is different from that of explorers 246.

The SAN access layer engine 242 aggregates the information it receives from various explorers into database 248. Once the various entities of SAN 140 are discovered, SAL 240 can continue to monitor the SAN and may update database 248 as new devices become available, as devices change states, or as events occur on the SAN. In one embodiment, SAL 240 periodically examines the SAN to discover or determine objects that are added, objects that are removed, and connections that have changed. Data collected in database 248 is typically updated in a real-time or periodic manner, and distributed to any other devices or software entities that might need the information. Data from database 242 can be provided to other devices or software entities via information agent 244. For example, information agent 244 can translate information from database 248 into formatted files (e.g. XML files), which can be provided to client applications, such as TPC device selection module 262 (described below). Additionally, a specially designed SAN access layer (SAL) application programming interface (API) 230 can provide various other programs in the system with specialized access to and control of the information in database 248 through function and procedure calls accessible through the API. In the example of FIG. 2, SAL API 230 is shown as a separate software entity (e.g., a dynamically linked library). In other implementations, SAL API 230 is in the form of code or code libraries used (e.g., at compile time) as part of the process of creating an SAL aware application or module, such as TPC device selection module 262. Thus in some embodiments, SAL API 230 can be part of TPC device selection module 262.

In general, the SAN access layer is designed to discover and manage a variety of different devices in the SAN. However, in the examples illustrated SAN access layer and related entities, e.g., explorers 254 and 266, and SAL API 230 include some functionality that may be specific to the tasks of discovering third-party copy devices and selecting the most effective third-party copy device for a particular data moving task.

A typical configuration of a system like computing system 200 may contain hundreds of clients and tens of media servers. Master server 210 maintains the backup policies and initiates scheduled backups, while clients own and maintain primary data that needs to be backed up. The media servers are media hosts that control and/or execute specific backup jobs. Each media server is typically associated with one or more destination storage devices (media). A particular media server typically sees and has paths to its associated destination storage devices, but may not see or have access to all storage devices on the SAN. A backup client always sees and has paths to its primary data, but similarly may not see or have access to all devices on the SAN. When a client server-free backup is started, clients convert their local disk paths to system-wide unique disk identifiers, which are communicated to the selected media server. These unique disk identifiers are then used by the media server to obtain disk address information in the mode and format appropriate to the backup method, as described below.

SAN access layer 240 is generally responsible for discovering and maintaining information on devices that can perform third-party copy operations. Because of the complexity associated with selecting the best third-party copy device for use in a given data moving operation, TPC device selection module 262, typically operates in conjunction with SAL 240 and SAL API 230. Third-party copy device discovery and selection processes are described in greater detail below with respect to FIGS. 3 and 4. Although that discussion generally focuses on third-party copy devices using the SCSI-3 extended copy command, the techniques can be extended to other types of third-party copying. For example, if the third-party copying is to be performed by a media server acting as a copy agent, the media server needs to see and have paths to client disks and the storage device, i.e. the media server must have the ability to query device data to obtain local paths to the client disks. Although this type of functionality is, in some sense, inherent in the design of media server software, additional discovery services may be needed to determine, for example, whether a given media server is configured for this type of operation, has access to the appropriate devices, etc. Thus, TPC device selection module 262 can perform certain verification tasks when the media server itself is specified as a copy agent. For example, a system administrator might request, via module 262, that the media server serve as a copy agent for data from client disks 272 to tape robot 284. Module 262 would then verify access to the various specified devices. It should be noted that in this particular example, TPC device selection module 262 services might not be needed because the very nature of media server configuration and operation typically includes the establishment of which devices are and are not part of the storage domain associated with media server 260.

If a third-party copy device present on the SAN, e.g., bridge 280 or tape robot 294, is to be used for the data movement operation, TPC device selection module 262 can be used to select the most effective device to use based on parameters such as third-party copy device attributes, relevant media server, source device(s), and destination device (s). Thus, TPC device selection module 262 confirms that the specified media server can see, and has paths to, the destination storage device and the third-party copy device. The media server need not (and might not) be able to see the source devices, that is the source devices might be in another storage domain or in a different zone of the SAN. Because it controls the data protection operation and sends the extended copy command or commands to the third-party copy device, the media server should be able to discover disks associated with clients servers, and to construct disk and destination storage device target descriptors for use with the extended copy command.

For example, if switch 270, client disks 272, and client disks 274 are part of a fibre channel zone separate from the other devices, some of the visibility and addressing challenges that may be encountered in zoned SAN environments can be illustrated. Client disks 272 are not visible to, and cannot generally be discovered from media server 260, but they can be discovered by a remote discovery agent, e.g., explorers 254, running on client server 250. Because of the SAN zoning, only the bridge-resident TPC device (280) can be used to backup client disks 272. Other third-party copy devices such as tape robot 294 and media server 260 (operating as a copy agent) cannot be used with client disks 272 because media server 260 and tape robot 294 are in a zone different from that of client disks 272.

Client disks 282 might be accessible via two different bridge ports, with different world-wide port numbers (WWPNs) and possibly different logical unit numbers (LUNs). Thus, client disks 282 can be backed up by either of the two third-party copy devices shown (bridge 280 and tape robot 294), as well as using the media server copy agent backup method. If it is desired to use one of the two third-party copy devices, the preferred choice for backing up client disks 282 would be the bridge-resident TPC because it has the "shortest" path (fewest interconnect hops) to the source and destination devices. Using TPC device selection module 262, the media server is able to query device data and develop a list of qualifying third-party copy devices that have access to the source and destination devices. The list can be presented in shortest-path order, path information can be presented for each eligible TPC device, or other information can be presented that is relevant to selection of the most appropriate or efficient third-party copy device for the task. Thus, an administrator can specify a media server, a source device, and a destination device and receive back relevant information about the best third-party copy device for the job. In some embodiments, an administrator will then have the option of selecting one of the TPC devices, while in other embodiments TPC device selection module 262, media manager 264, or another software entity may simply select what it believes to be the best TPC device for the task.

Although illustrated as separate modules of media server 260, the relevant functionality of TPC device selection module 262 and media manager 264 can be part of the same program, or distributed among different programs. Moreover, TPC device selection module 262 might simply include a set of relevant function of procedure calls to SAL API 230 which in turn determines TPC device selection criteria based on information gathered by SAL 240 and retained in database 248. In another embodiment, the functionality of TPC device selection module 262 is provided by another application programming interface that is called by one of the data protection programs such as media manager 264. Still other embodiments distribute selection functionality among all of the entities mentioned. Still other variations on the distribution of TPC device discovery and selection will be known to those having ordinary skill in the art.

Figure 3:
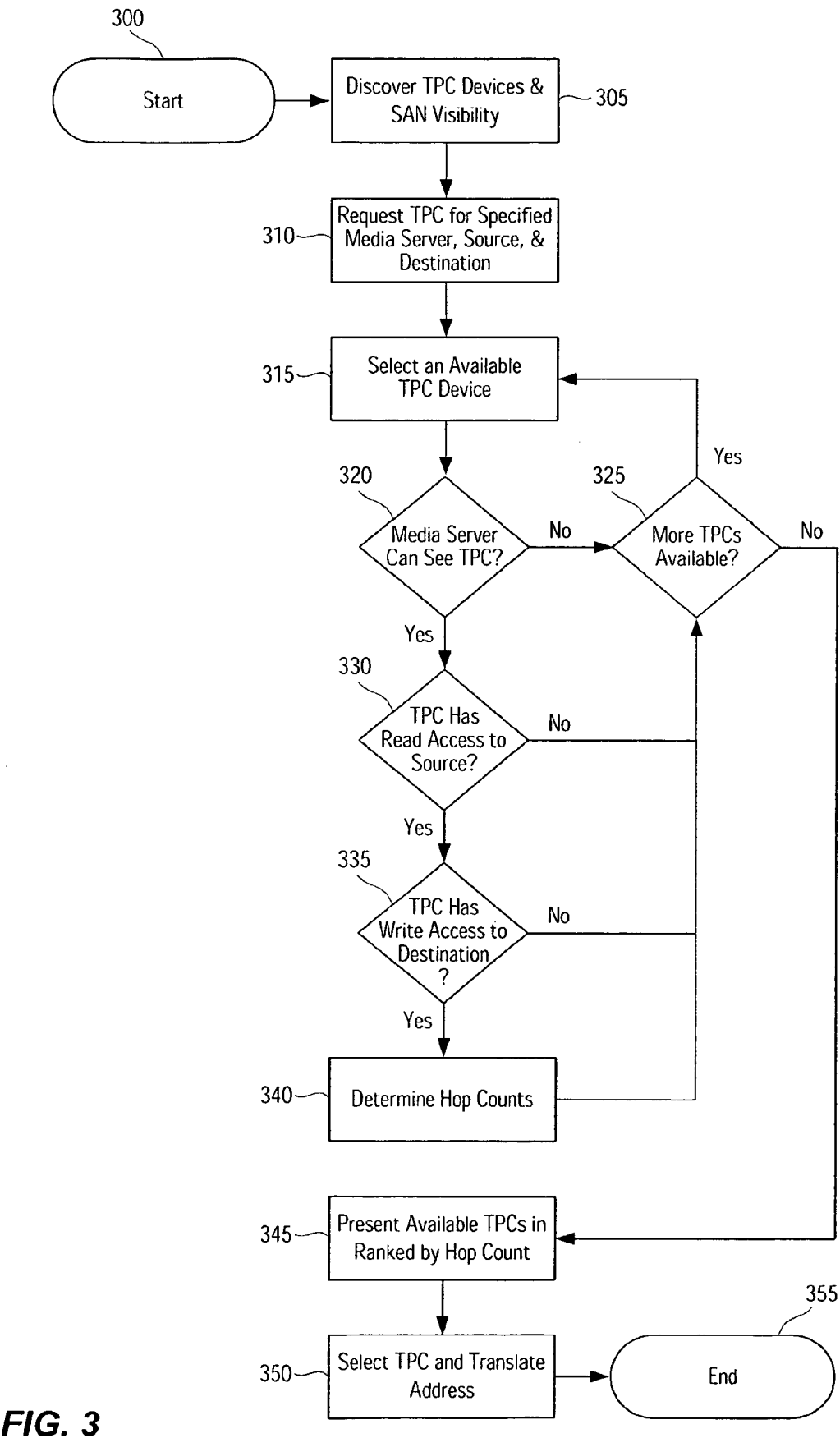
FIG. 3 is a flow chart illustrating techniques of the present invention.
Figure 4:
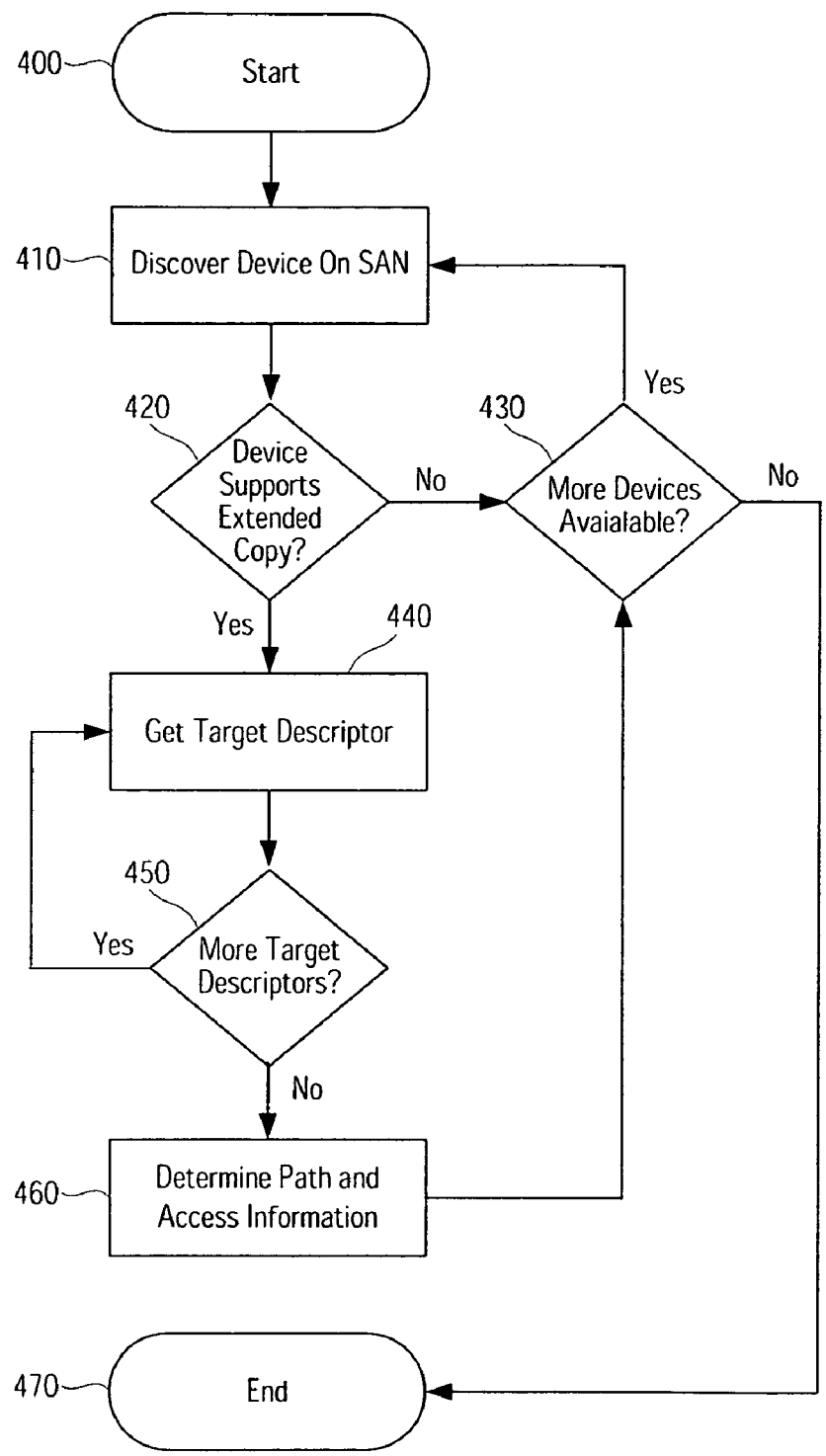
FIG. 4 is a flow chart illustrating techniques of the present invention.

FIGS. 3 and 4 illustrate some examples of the third-party copy device discovery and selection processes. As noted above, the examples in FIGS. 3 and 4 focus on TPC devices that utilize the SCSI-3 extended copy command. SCSI-3 commands are described in SCSI Primary Commands-3 (SPC-3), Working Draft, Revision 03, T10, a Technical Committee of the Accredited Standards Committee of the National Committee for Information Technology Standards (NCITS), 10 Jan. 2002, which is hereby incorporated by reference herein in its entirety. The extended copy command provides a SCSI command to copy data from one set of devices to another. These devices can be disks, tapes, or other types of storage devices. The SCSI command can be used on devices connected via SCSI cables or Fibre Channel connections. In this example, a data mover that supports the SCSI-3 extended copy command receives and performs the extended copy command. In general, the data mover is an intelligent device somewhere in the storage infrastructure that understands the extended copy command. The data mover can be a server, but more likely will be a smart storage device, such as an intelligent tape device, disk device, SAN switch or storage router. The host server typically has some additional processing to perform at first, in order to gather all file or volume information necessary to pass along inside the extended copy command. Additionally, if either the source or destination of the extended copy is a removable media device, the host will typically first issue other SCSI commands to get the removable device into the proper position (loading or positioning the tape). Next, the host issues the extended copy command to the data mover, telling the device to move data from one storage device directly to another storage device. After issuing the extended copy command, no further instructions have to be issued by the host to move the data—the devices themselves perform the entire data movement operation over the SCSI bus or Fibre Channel connection.

Additionally, the nature of the extended copy command and the manner in which it is supported by devices can dictate certain steps to be taken as part of the discovery and selection processes. For example, an extended copy command may reference one or more target devices (the name given by the extended copy command description to source and/or the destination logical units). Each target device is described by one or more target descriptors. All target descriptors have their formats specified by an extended copy descriptor code. However, a particular third-party copy device may not support all target descriptor formats. Consequently, part of the device discovery process typically includes gathering all target descriptor information, e.g., issuing certain SCSI commands to the TPC device and receiving resulting data.

As required by the SCSI-3 specification, all target descriptors are 32 bytes in length and begin with a four-byte header that contains the descriptor type code field that identifies the format of the descriptor. Assigned values for target descriptor type codes include:

| | |
|---|---|
| E0h | Fibre Channel World Wide Name target descriptor |
| E1h | Fibre Channel N_Port target descriptor |
| E2h | Fibre Channel N_Port with World Wide Name checking target descriptor |
| E3h | Parallel Interface T_L target descriptor |
| E4h | Identification descriptor target descriptor |
| E5h | IPv4 target descriptor |
| E6h | Alias target descriptor |
| E7h | RDMA target descriptor |
| E8h | IEEE 1394 EUI-64 target descriptor |
| E9h-FFh | Reserved for target descriptors |

The target descriptors contain other information useful in determining a device's ability to perform extended copy operations. For example, a target descriptor typically includes a bit whose value indicates whether or not the device will receive commands. Also included is a peripheral device type field for specifying the type of device the third-party copy device is, e.g., disk, tape, optical memory, medium changer, etc. The value in the descriptor type field determines the format of the target descriptor parameters that follow the four-byte header and precede the device type specific parameters. The value in the peripheral device type field determines the format of the device type specific parameters that follow the target descriptor parameters. The device type specific parameters convey information specific to the type of device identified by the target descriptor. Additional information about the extended copy command can be found in the aforementioned SCSI-3 standard.

FIG. 3 illustrates one example of the TPC device discovery and selection process. Upon initiation (300), the process first involves the discovery of TPC devices and SAN visibility/access to those devices (305). As previously noted, the discovery process is often implemented as a recurring process. So, for example, an initial set of discovery operations might be performed when the SAN is first brought on-line. Subsequent discovery operations will typically be performed to detect changes in the SAN and attached devices.

FIG. 4 illustrates elements of the device discovery process (e.g., step 305) that might be specific to the discovery of third-party copy devices. Upon initiation of the process at 400, the existence of a device on the SAN is discovered (410). Again, this might be part of the normal discovery process performed by SAN access layer 240 as described above. In step 420, it is determined whether the device supports the extended copy command. This determination might include issuing one or more SCSI commands, e.g., inquiry or mode sense commands, that probes information on the device such as the devices ability to accept and execute extended copy commands. If it is determined that the device does not support the extended copy command, operation transitions to 430. If there are other devices available, the process returns to 410, otherwise the discovery process terminates at 470. If it is determined that the device does support extended copy, operation transitions to 440 where target descriptor information is gathered. If there are additional target descriptors as determined in 450, the process returns to 440 where information about the additional target descriptor is gathered. In this way, all of the extended copy addressing modes supported by the device can be discovered. For example, a given device may have multiple applicable target descriptors, such as multiple WWPN & LUN addresses.

Once all target descriptor information is gathered, additional path information and device access information can be gathered (460). This operation typically focuses on path information and device access information related directly to the TPC device. However, it can include information related to the devices that may potentially be accessed by the TPC device, e.g., potential source and destination devices. Since all path-dependent descriptors are typically discovered and retained, additional path related information, e.g. which host or TPC device can use each descriptor, is also gathered. Certain verification steps can also be performed at this time. For example, there may be restrictions on the LUNs in target descriptors, e.g., they must be physical fibre channel LUNs) used by the TPC device to access data. It should be noted that as shown, step 460 is only performed on devices that support the extended copy command. This may not generally be the case in some implementations. For example, path and device access information might be gathered for all devices (regardless of whether they are TPC devices) in a process independent of the process for determining whether a device can be used as a TPC device. Finally, when there are no more descriptors and no more devices to analyze, the process terminates at 470.

Again, it should be noted that the discovery steps illustrated are generally related to extended copy command devices. Other third-party copy devices can be used, and thus the nature of the discovery process can change depending upon the corresponding data moving device. Discovery steps are performed by and/or in conjunction with one or more of SAL 240, SAL API 230, various explorers external to SAL 240, and TPC device selection module 264. Moreover, the information gathered is typically stored in a persistent repository (e.g., database 248) and made available for use to various system devices and software entities.

Returning to FIG. 3, step 305 can also include the discovery of SAN visibility/access to the discovered TPC devices, and to other relevant entities such as media server 260. For example, all SAN visibility and access restrictions due to zoning, LUN masking, and LUN access control should also be discovered and kept up to date in database 248. Gathering other information such as which servers have access to a storage device, which TPC devices can access a set of storage devices, etc. may also be part of step 305.

Since a discovery operation may be occurring while actual data protection operations (e.g., a backup operation) are being performed, mechanisms are typically implemented to ensure that the discovery process does not interfere with the data protection operations. Such mechanisms should be implemented to either allow various discovery components to temporarily stop discovery activities directed at a device currently in use in a data protection operation, or to pause data protection operations long enough to allow discovery activities to proceed without endangering the data protection process.

Once various third-party copy devices have been discovered, an administrator or automated process can request that a data movement operation be performed. In one embodiment, the request is made by specifying a media server, one or more source storage devices, and one or more destination storage devices. Given that the request might be presented to TPC device selection module 262 on media server 260, it may be unnecessary to explicitly specify the media server. On receipt of such a request, an available TPC device is selected (315) for examination. In one embodiment, the process of selecting one or more available TPC devices involves In step 320, it is determined whether the specified media server can see the selected TPC device. In one embodiment, information previously gathered and stored in a database such as database 248 is accessed to make the determination. In another embodiment, the determination includes one or more function calls to SAL API 230. For example, TPC device selection module 262 can call API functions designed to determine if two specified devices (i.e., the media server and the selected TPC device) are physically and logically connected. If the media server cannot see the selected TPC device, operation transitions to 325 where it is determined if there are more TPC devices available as possible candidates for the data movement task. If so, operation returns to 305. If not, operation transitions to 345 as described below.

Next, it is determined whether the selected TPC device has read access to the source storage devices specified in the initial request (330). As in the case of step 320, the determination at 330 can utilize information previously gathered and stored in a database such as database 248 and/or utilize one or more function calls to SAL API 230, such as function calls to determine if the TPC device and the source storage devices are physically and logically connected. If the selected TPC device does not have read access to one or more of the storage devices, then the selected TPC device is unsuitable of the data moving task and operation transitions to 325 as described above. Note that in cases where several source storage devices are specified, the selected TPC device should have read access to all of the devices in order to be a suitable candidate. If the selected TPC device does have the required source storage device read access, then it is determined in 335 whether the selected TPC device also has required destination device write access. This determination can be made in a manner similar to that of 320 and 335. In this example, the selected TPC device might not necessarily need write access to all destination storage devices indicated in the request. For example, if a tape library or robot device is specified as the destination device and the selected TPC device has read access to only some of the tape drives available, the TPC device may still be appropriate for the data movement operation. If the selected TPC device does not have write access to at least one of the destination storage devices, then the selected TPC device is unsuitable of the data moving task and operation transitions to 325 as described above.

Next in 340, the number the hop counts associated with the three devices (media server, source, and destination) are determined. The hop count determination is performed to ascertain the number of SAN interconnects or "hops" between two devices in the SAN. This information allows for a useful comparison among different TPC devices that can perform the same data movement operation. The device for which the fewest hops are required typically has the shortest network paths to deal with, and thus will typically be the most efficient TPC device for the task. Since the SAL 240 typically has the information needed to determine hops between various SAN devices, e.g., between the source and the TPC device, and between the destination and the TPC device, the information can be taken directly from database 248 or received as the result of a function call to SAL API 230. In this example, path length is the most important criteria used to determine which TPC device among several should perform a particular data moving task. However, other criteria can also be used and corresponding determination steps might also be implemented. For example, relative performance information about the various TPC devices; performance information about various SAN devices (e.g., switches and bridges) between hops; SAN fabric or segment bandwidth information; pending data moving jobs; TPC device status; TPC device attributes; user policies; address modes and the like can all be factored in to the evaluation of each TPC device.

Once the desired additional performance indicators are measured, operation transitions to 325. If more TPC devices remain to be analyzed, operation returns to 315. If there are no more TPC devices to be evaluated, the available TPC devices that are acceptable are presented to user (345) with some ranking or indication based on performance criteria such as hop count. At that point, the user can select the most appropriate device for the data moving task. In one embodiment, the most appropriate TPC device is selected automatically by the software. Once a device is selected (350) final preparations are made for its use. In the example illustrated, that preparation can include translating relevant addresses from one format into another. For example, different device addressing modes may be needed for different backup scenarios. Similarly, a single backup job might require the use of multiple address modes at different stages. The conversion process can include, for example, converting from SAL specific object identifiers to operating system path information or vice versa; and converting from SAL specific object identifiers or operating system path information to extended copy compliant target descriptors or vice versa. Still other conversion operations will be well known to those having skill in the art depending on the device naming/addressing schemes used. Functions for converting between address modes can be provided by SAL API 230. Once these tasks are completed (355), the appropriate TPC device is determined and the data protection operation can proceed using the selected device.

Still other variations on these techniques can be implemented. Instead of the request specifying a media server, one or more source storage devices, and one or more destination storage devices, the request might simply specify the source storage devices. In such an implementation, possible destination devices must also be gathered and considered along with the TPC devices.

SAN topology changes may be temporarily made for the purposes of performing a data protection operation. Thus, disks might be dynamically "zoned in" for a backup operation, and then "zoned out" after the backup operation is completed. The timing of discovery is particularly relevant in these examples. Discovery refresh might be triggered by data protection software to accommodate the desired topology changes. Devices that are "zoned out" may need to be flagged as such, but retained in the SAL database to allow policy configuration maintenance.

In general, SAL API clients such as TPC device selection module 262 and media manager 264 should be able to subscribe to event notification of discovered device status/mapping changes, added/removed devices, etc. Notification of newly detected devices may be the first discovery step in some cases. For example, information about new devices may be needed to create operating system handle(s) which can then be used to complete device discovery using in-band methods, and to access the device using operating system calls.

The flow charts of FIGS. 3 and 4 illustrate some of the many operational examples of third-party copy device discovery and selection disclosed in the present application. Those having ordinary skill in the art will readily recognize that certain steps or operations illustrated in FIGS. 3 and 4 can be eliminated or taken in an alternate order. Moreover, the methods described in FIGS. 3 and 4 and many of the modules illustrated in FIG. 2 are typically implemented as one or more software programs for a computer system and are encoded in a computer readable medium as instructions executable on one or more processors. The computer readable medium can be any one of an electronic storage medium, a magnetic storage medium, an optical storage medium, and a communications medium conveying signals encoding the instructions. Separate instances of these programs can be executed on separate computer systems in keeping with the multi-process methods described above. Thus, although certain steps have been described as being performed by certain devices, software programs, processes, or entities, this need not be the case and a variety of alternative implementations will be understood by those having ordinary skill in the art.

Additionally, those having ordinary skill in the art will readily recognize that the techniques described above can be utilized in a variety of different storage devices and computing systems with variations in, for example, the number of clients and SAN devices, the type of operation of the computing system, e.g., cluster operation (failover, parallel, etc.), the number and type of shared data resources, and the number of paths between clients and shared data resources. The third-party copy device discovery and selection software can operate in whole or in part on host computer systems such as those illustrated in FIG. 2, and/or it can operate in whole or in part in storage appliances, switches, distributed devices, and the like.

Figure 5:
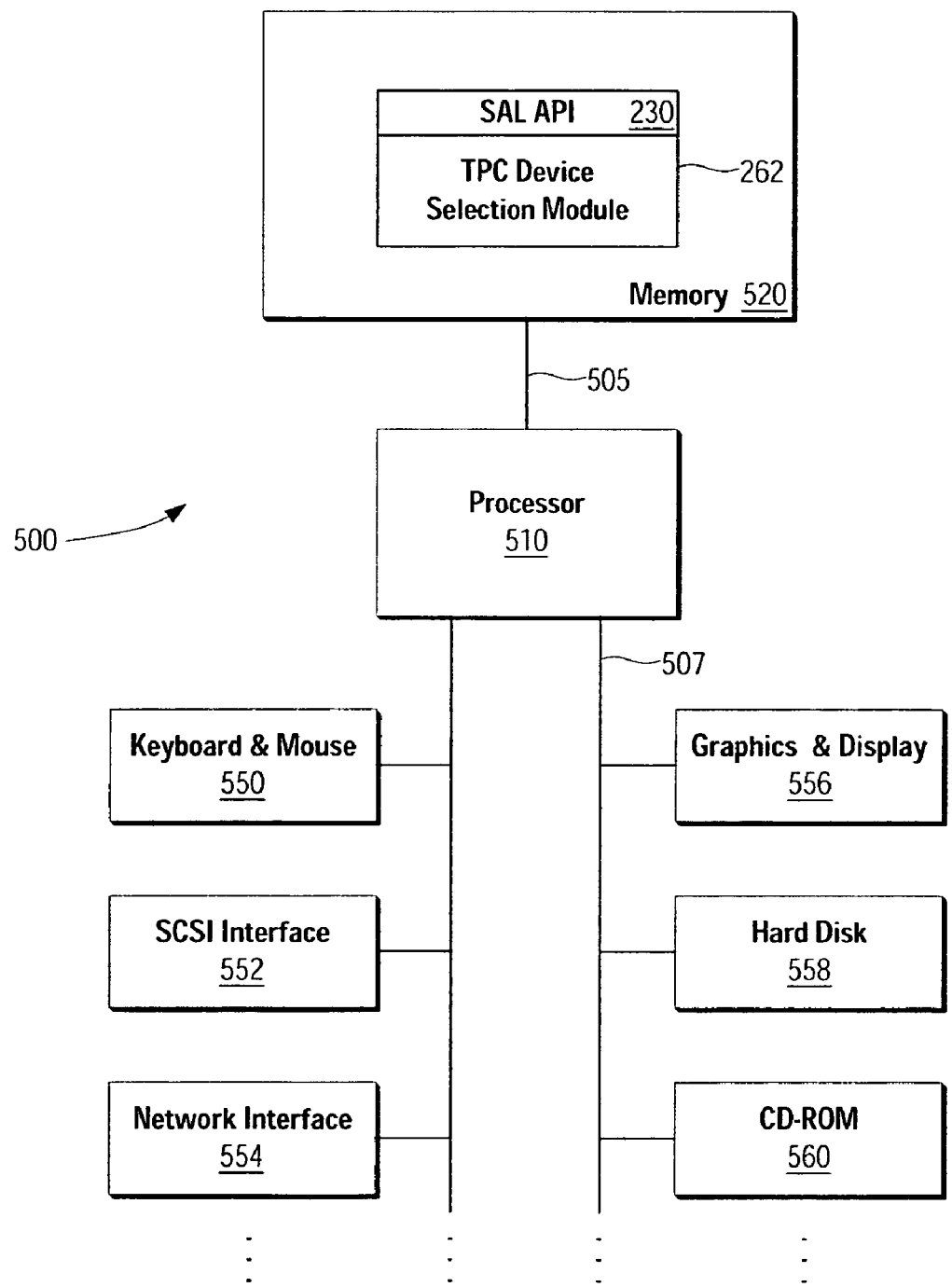
FIG. 5 is a block diagram of a computer system for implementing the techniques of the present invention.

FIG. 5 illustrates a block diagram of a computer system 500 for implementing the techniques for handling expandable storage of the present invention. For example, computer system 500 can be an embodiment of one of the previously described hosts. Computer system 500 includes a processor 510 and a memory 520 coupled together by communications bus 505. Processor 510 can be a single processor or a number of individual processors working together. Memory 520 is typically random access memory (RAM), or some other dynamic storage device, and is capable of storing instructions to be executed by the processor, e.g., SAL API 230 and TPC device selection module 262. Memory 520 is also used for storing temporary variables or other intermediate information during the execution of instructions by the processor 510.

Those having ordinary skill in the art will readily recognize that the techniques and methods discussed below can be implemented in software using a variety of computer languages, including, for example, traditional computer languages such as assembly language, Pascal, and C; object oriented languages such as C++, C#, and Java; and scripting languages such as Perl and Tcl/Tk. Additionally, software 230 and 262 can be provided to the computer system via a variety of computer readable media including electronic media (e.g., flash memory), magnetic storage media (e.g., hard disk 558, a floppy disk, etc.), optical storage media (e.g., CD-ROM 560), and communications media conveying signals encoding the instructions (e.g., via a network coupled to network interface 554).

Computer system 500 also includes devices such as keyboard & mouse 550, SCSI interface 552, network interface 554, graphics & display 556, hard disk 558, and CD-ROM 560, all of which are coupled to processor 510 by communications bus 507. It will be apparent to those having ordinary skill in the art that computer system 500 can also include numerous elements not shown in the figure, such as additional storage devices, communications devices, input devices, and output devices, as illustrated by the ellipsis shown. An example of such an additional computer system device is a fibre channel interface.

Although the present invention has been described with respect to a specific preferred embodiment thereof, various changes and modifications may be suggested to one skilled in the art and it is intended that the present invention encompass such changes and modifications fall within the scope of the appended claims.

What is claimed is:

1. A computer-implemented method comprising:
   identifying a plurality of third-party copy devices, wherein each of the third-party copy devices is configured to respond to an extended copy command by copying data from one storage device to another storage device, wherein the identifying comprises issuing a command to probe information to each of the third-party copy devices;

receiving a first extended copy command, wherein the first extended copy command specifies a source storage device from which first data will be transferred and a destination storage device to which the first data will be transferred as part of a data protection operation;

identifying a third-party copy device coupled to the source storage device and the destination storage device, wherein the third-party copy device is one of the plurality of third party copy devices; and determining a performance characteristic of at least one of: (1) the third-party copy device, and (2) a connection between the third-party copy device and the source storage device.

2. The method of claim 1 further comprising:
determining if a device coupled to the source storage device is the third-party copy device.

3. The method of claim 2 wherein the determining if the device coupled to the source storage device is the third-party copy device further comprises determining whether the device coupled to the source storage device supports a small computer system interface version three (SCSI-3) extended copy command.

4. The method of claim 1 wherein:
the identifying the third-party copy device further comprises identifying one or more third-party copy devices coupled to the source storage device and operable to copy the first data from the source storage device; and
the determining the performance characteristic further comprises for each respective third-party copy device of the one or more third-party copy devices, determining the respective performance characteristic of at least one of: (1) the respective third-party copy device, and (2) a respective connection between the respective third-party copy device and the source storage device.

5. The method of claim 4 further comprising:
presenting to a user, for each of the one or more third-party copy devices and in a ranked order, at least one of an indication of the respective third-party copy device and the respective performance characteristic of the respective third-party copy device.

6. The method of claim 1 further comprising:
selecting the third-party copy device for use in the data protection operation according to the performance characteristic.

7. The method of claim 1 further comprising:
presenting an indication of the third-party copy device and the performance characteristic to a user.

8. The method of claim 1 further comprising:
receiving an indication of a media server coupled to the source storage device.

9. The method of claim 1 wherein the first extended copy command comprises an indication of the source storage device, and the indication comprises at least one of: a device name, an operating system handle, a pathname, and an object identifier.

10. The method of claim 1 wherein the identifying the third-party copy device further comprises at least one of:
determining that the third-party copy device has read access to the source storage device;
determining that the third-party copy device is logically connected to the source storage device; and
determining that the third-party copy device is physically connected to the source storage device.

11. The method of claim 1 wherein the determining the performance characteristic further comprises:
determining at least one of: a status of the third-party copy device, an attribute of the third-party copy device, and an address mode of the third-party copy device.

12. The method of claim 1 wherein the determining the performance characteristic further comprises:
determining a network interconnect count for the connection between the third-party copy device and the source storage device.

13. A system comprising:
a memory;
a processor coupled to the memory; and
a third-party copy device selection module, wherein at least a portion of the third-party copy device selection module is encoded as instructions stored in the memory and executable on the processor, and wherein the third-party copy device selection module is configured to:
identify a plurality of third-party copy devices, wherein each of the third-party copy devices is configured to respond to an extended copy command by copying data from one storage device to another storage device, wherein identifying the third-party copy devices comprises issuing a command to probe information to each of the third-party copy devices;
receive a first extended copy command, wherein the first extended copy command specifies a source storage device from which first data can be transferred and a destination storage device to which the first data will be transferred as part of a data protection operation;
identify a third-party copy device coupled to the source storage device and the destination device, wherein the third-party copy device is one of the plurality of third party copy devices; and
determine a performance characteristic of at least one of: (1) the third-party copy device, (2) a connection between the third-party copy device and the source storage device, and (3) a connection between the third-party copy device and the destination storage device.

14. The system of claim 13 further comprising:
a storage network;
the third-party copy device, wherein the third-party copy device is coupled to the storage network;
the source storage device; and
the destination storage device.

15. The system of claim 14 wherein the third-party copy device selection module is further configured to:
determine if a device coupled to the source storage device is the third-party copy device.

16. The system of claim 15 wherein the third-party copy device selection module is further configured to:
determine whether the device coupled to the source storage device supports a small computer system interface version three (SCSI-3) extended copy command.

17. The system of claim 14 further comprising at least one of:
a data protection media manager encoded as instructions stored in the memory and executable on the processor, and configured to at least one of:
monitor a plurality of storage devices;
monitor storage media; and
control the plurality of storage devices; and
a data protection process manager encoded as instructions stored in the memory and executable on the processor and configured to at least one of:

schedule a first data protection operation associated with a client computer system;
track the first data protection operation associated with the client computer system; and
control the first data protection operation associated with the client computer system;
wherein the third-party copy device selection module is in communication with the at least one of the data protection media manager and the data protection process manager.

18. The system of claim 14 further comprising at least one of:
a data protection media manager encoded as instructions stored in the memory and executable on the processor, and configured to at least one of:
monitor a plurality of storage devices;
monitor storage media; and
control the plurality of storage devices; and
a data protection process manager encoded as instructions stored in the memory and executable on the processor and configured to at least one of:
schedule a first data protection operation associated with a client computer system;
track the first data protection operation associated with the client computer system; and
control the first data protection operation associated with the client computer system;
wherein the third-party copy device selection module is part of the at least one of the data protection media manager and the data protection process manager.

19. The system of claim 14 wherein the third-party copy device selection module is further configured to:
select the third-party copy device for use in the data protection operation according to the performance characteristic.

20. The system of claim 14 wherein the third-party copy device selection module is further configured to:
present an indication of the third-party copy device and the performance characteristic to a user.

21. The system of claim 14 wherein the first extended copy command comprises an identifier of the source storage device, and the identifier comprises at least one of: a device name, an operating system handle, a pathname, and an object ID.

22. The system of claim 14 wherein the third-party copy device selection module is further configured to at least one of:
determine that the third-party copy device has read access to the source storage device;
determine that the third-party copy device is logically connected to the source storage device; and
determine that the third-party copy device is physically connected to the source storage device.

23. The system of claim 14 wherein the third-party copy device selection module is further configured to:
determine at least one of: a status of the third-party copy device, an attribute of the third-party copy device, and an address mode of the third-party copy device.

24. The system of claim 14 wherein the third-party copy device selection module is further configured to:
determine a network interconnect count for at least one of:
(1) the connection between the third-party copy device and the source storage device, and (2) the connection between the third-party copy device and the destination storage device.

25. A computer readable medium persistently storing program instructions executable on a processor, the computer readable medium being at least one of an electronic storage medium, a magnetic storage medium, and a optical storage medium, wherein the program instructions are operable to implement each of:
identifying a plurality of third-party copy devices, wherein each of the third-party copy devices is configured to respond to an extended copy command by copying data from one storage device to another storage device, and wherein the identifying comprises issuing a command to probe information to each of the third-party copy devices;
receiving a first extended copy command, wherein the first extended copy command specifies a source storage device from which first data will be transferred and a destination storage device to which the first data will be transferred as part of a data protection operation;
identifying a third-party copy device coupled to the source storage device and the destination device, wherein the third-party copy device is one of the plurality of third party copy devices;
determining a performance characteristic of at least one of: (1) the third-party copy device, and (2) a connection between the third-party copy device and the source storage device.

26. The computer readable medium of claim 25 further comprising program instructions operable to implement:
determining if a device coupled to the source storage device is the third-party copy device.

27. The computer readable medium of claim 26 further comprising program instructions operable to implement:
determining whether the device coupled to the source storage device supports a small computer system interface version three (SCSI-3) extended copy command.

28. The computer readable medium of claim 25 wherein:
the identifying the third-party copy device further comprises identifying one or more third-party copy devices coupled to the source storage device and operable to copy the first data from the source storage device; and
the determining the performance characteristic further comprises for each respective third-party copy device of the one or more third-party copy devices, determining the respective performance characteristic of at least one of: (1) the respective third-party copy device, and (2) a respective connection between the respective third-party copy device and the source storage device.

29. The computer readable medium of claim 28 further comprising program instructions operable to implement:
presenting to a user, for each of the one or more third-party copy devices and in a ranked order, at least one of an indication of the respective third-party copy device and the respective performance characteristic of the respective third-party copy device.

30. The computer readable medium of claim 25 further comprising program instructions operable to implement:
selecting the third-party copy device for use in the data protection operation according to the performance characteristic.

31. The computer readable medium of claim 25 further comprising program instructions operable to implement:
presenting an indication of the third-party copy device and the performance characteristic to a user.

32. The computer readable medium of claim 25 further comprising program instructions operable to implement:
receiving an indication of a media server coupled to the source storage device.

33. The computer readable medium of claim 25 wherein the first extended copy command comprises an indication of the source storage device, and the indication of the source storage device comprises at least one of: a device name, an operating system handle, a pathname, and an object identifier.

34. The computer readable medium of claim 25 further comprising program instructions operable to implement:
- determining that the third-party copy device has read access to the source storage device;
- determining that the third-party copy device is logically connected to the source storage device; and
- determining that the third-party copy device is physically connected to the source storage device.

35. The computer readable medium of claim 25 further comprising program instructions operable to implement:
- determining at least one of: a status of the third-party copy device, an attribute of the third-party copy device, and an address mode of the third-party copy device.

36. The computer readable medium of claim 25 further comprising program instructions operable to implement:
- determining a network interconnect count for the connection between the third-party copy device and the source storage device.

37. An apparatus comprising:
- a means for identifying a plurality of means for performing third-party copy operations, wherein each of the means for performing third-party copy operations is configured to respond to an extended copy command by copying data from one storage device to another storage device, wherein identifying the plurality of means for performing third-party copy operations comprises issuing a command to probe information to each of the means for performing third-party copy operations;
- a means for receiving a first extended copy command, wherein the first extended copy command specifies a means for storing source data from which first data will be transferred and a means for storing destination data to which the first data will be transferred as part of a data protection operation;
- a means for identifying a means for performing third-party copy operations, wherein the means for performing third-party copy operations is coupled to the means for storing source data and the means for storing destination data;
- a means for determining a performance characteristic of at least one of: (1) the means for performing third-party copy operations, and (2) a connection between the means for performing third-party copy operations and the means for storing source data;
- a display means for presenting an indication of the means for performing third-party copy operations and the performance characteristic to a user.

38. The apparatus of claim 37 further comprising:
a means for selecting the means for performing third-party copy operations for use in the data protection operation according to the performance characteristic.

39. The apparatus of claim 37 further comprising:
a means for determining if a device coupled to the means for storing source data is the means for performing third-party copy operations.

40. The apparatus of claim 37 further comprising:
a means for determining at least one of: a status of the means for performing third-party copy operations, an attribute of the means for performing third-party copy operations, and an address mode of the means for performing third-party copy operations.

41. The apparatus of claim 37 further comprising:
a means for determining a network interconnect count for the connection between the means for performing third-party copy operations and the means for storing source data.

* * * * *